(12) United States Patent
Cox et al.

(10) Patent No.: US 8,887,901 B2
(45) Date of Patent: Nov. 18, 2014

(54) CONVEYOR SPROCKET ASSEMBLY

(75) Inventors: Michael S. Cox, Fayetteville, WV (US); William J. Miller, Franklin, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 53 days.

(21) Appl. No.: 13/561,682

(22) Filed: Jul. 30, 2012

(65) Prior Publication Data
US 2014/0027247 A1 Jan. 30, 2014

(51) Int. Cl.
*B65G 23/06* (2006.01)
*F16H 55/12* (2006.01)

(52) U.S. Cl.
USPC .............. 198/834; 198/835; 474/95; 403/289

(58) Field of Classification Search
USPC ......... 198/834, 835, 842; 474/95, 96; 74/450; 403/11, 12, 289
See application file for complete search history.

(56) References Cited

U.S. PATENT DOCUMENTS

| | | | |
|---|---|---|---|
| 1,623,814 A | 4/1927 | Scott | |
| 3,685,367 A * | 8/1972 | Dawson | 198/834 |
| 4,037,713 A * | 7/1977 | Soliman et al. | 198/725 |
| 4,049,112 A | 9/1977 | Tyslauk | |
| 4,253,344 A | 3/1981 | Kerklies | |
| 4,437,564 A | 3/1984 | Redder et al. | |
| 4,865,183 A | 9/1989 | Hodlewsky et al. | |
| 5,295,917 A | 3/1994 | Hannum | |
| 5,316,522 A | 5/1994 | Carbone et al. | |
| 5,389,044 A | 2/1995 | Bandy, Jr. et al. | |
| 5,469,958 A | 11/1995 | Gruettner et al. | |
| 5,702,316 A | 12/1997 | Cole | |
| 5,833,562 A | 11/1998 | Walker, Sr. | |
| 5,947,265 A * | 9/1999 | Merten et al. | 198/834 |
| 6,074,316 A | 6/2000 | Murrietta, Sr. | |
| 6,086,495 A | 7/2000 | Stebnicki et al. | |
| 6,146,299 A | 11/2000 | Harvey | |
| 6,758,776 B2 | 7/2004 | Fye et al. | |
| 7,228,924 B2 * | 6/2007 | DeLong et al. | 180/56 |
| 7,261,291 B2 | 8/2007 | Forch et al. | |
| 7,604,113 B2 * | 10/2009 | Pluszynski et al. | 198/850 |
| 7,753,193 B2 * | 7/2010 | Kanaris | 198/834 |
| 7,819,766 B2 * | 10/2010 | Kennedy | 474/152 |
| 8,042,682 B2 * | 10/2011 | Ertel | 198/834 |
| 8,070,375 B2 * | 12/2011 | Moore | 403/13 |
| 2004/0147348 A1 | 7/2004 | Yiu et al. | |
| 2007/0161443 A1 | 7/2007 | Krisl | |

FOREIGN PATENT DOCUMENTS

| | | |
|---|---|---|
| JP | 2001227601 | 8/2001 |
| SU | 1537615 | 1/1990 |
| SU | 1586891 | 8/1990 |

* cited by examiner

*Primary Examiner* — Douglas Hess
(74) *Attorney, Agent, or Firm* — Michael Best & Friedrich LLP

(57) ABSTRACT

A conveyor sprocket assembly generally includes a support shaft, at least one conveyor sprocket slidably engaging the support shaft, and an abutment stop positioned adjacent the conveyor sprocket. The abutment stop is configured to be removed to allow the conveyor sprocket to slide axially along the support shaft.

22 Claims, 9 Drawing Sheets

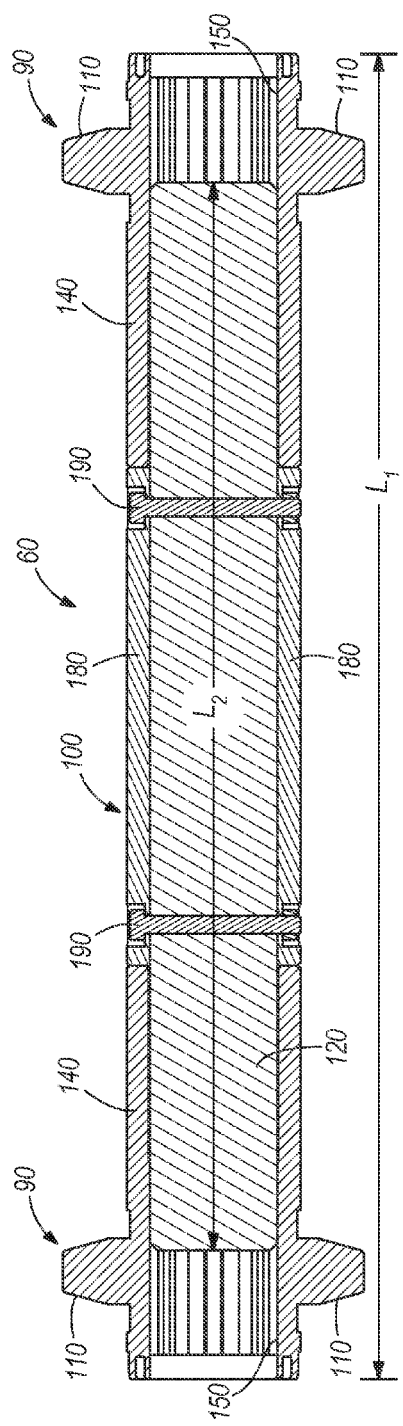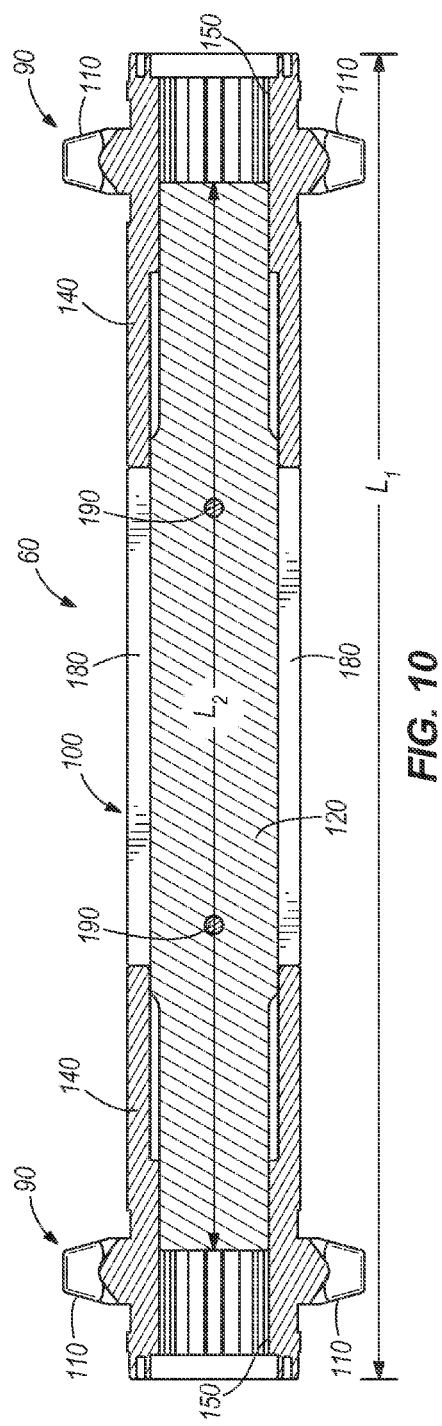

CONVEYOR SPROCKET ASSEMBLY

BACKGROUND

In mining, it is typical to employ one or more conveyors to haul or convey crushed ore. For example, a continuous miner includes a miner conveyor that gathers and directs the material away from the mining face. The miner conveyor extends toward the rear of the miner, and deposits the material removed from the mining face onto a conveyor bridge module. In turn, the conveyor bridge module conveys and eventually deposits the material into a hopper, which sizes the material and deposits the sized material onto a face conveyor. The face conveyor carries the material away from the mining site. Most conveyor systems employed in mining include a conveyor belt and a pair of conveyor sprockets supporting the conveyor belt. The conveyor belt can be based on an endless belt or chain flights. The conveyor sprockets are mounted on a drive shaft, which in turn is coupled to a conveyor frame.

SUMMARY

Through continued use, a conveyor sprocket may become worn and potentially damaged. When this happens, the conveyor sprocket must be removed from the drive shaft and replaced. Removing and replacing the conveyor sprocket can be costly and time consuming. First, the drive shaft needs to be separated from the conveyor frame or other support structures. This may require removing or disassembling the conveyor frame. Once the drive shaft is disengaged, the conveyor sprocket is pulled off the drive shaft and a new one is slid into position. Removing and replacing the conveyor sprocket is time-consuming, cumbersome, and costly due to the equipment downtime. Thus, there has developed a need for a conveyor sprocket assembly that can be expediently and easily removed and replaced.

In some embodiments, a conveyor sprocket assembly generally includes a support shaft, at least one conveyor sprocket slidably engaging the support shaft, and an abutment stop positioned adjacent the conveyor sprocket. The abutment stop is configured to be removed to allow the conveyor sprocket to slide axially along the support shaft.

In other embodiments, a conveyor sprocket assembly defines an axial length and generally includes a support shaft having a length shorter than the axial length. At least one conveyor sprocket slidably engages an end portion of the support shaft and a conveyor drive assembly. The conveyor sprocket comprises a generally cylindrical member defining an axial opening therein for receiving the end portion of the support shaft. An abutment stop is positioned adjacent the conveyor sprocket. The abutment stop is configured to be removed to allow the conveyor sprocket to slide axially along the support shaft for removing the conveyor sprocket from the conveyor drive assembly.

In still other embodiments, a conveyor system defines a longitudinal axis, and generally includes a conveyor extending along the longitudinal axis, two side frames, a support shaft, at least one conveyor sprocket, and an abutment stop. The conveyor defines two sides that are each parallel to the longitudinal axis. The two side frames respectively extend along each side of the conveyor. The side frames define a gap therebetween. The support shaft has a length shorter than the gap. The conveyor sprocket slidably engages an end portion of the support shaft and a respective side frame. The abutment stop is positioned adjacent the conveyor sprocket, and is configured to be removed for removing the conveyor sprocket from the side frames.

Other aspects of the invention will become apparent by consideration of the detailed description and accompanying drawings.

BRIEF DESCRIPTION OF THE DRAWINGS

FIG. 9 is a cross-sectional view of the conveyor sprocket assembly taken along line 9-9 of FIG. 7.

FIG. 10 is a cross-sectional view of the conveyor sprocket assembly taken along line 10-10 of FIG. 8.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

Figure 1:
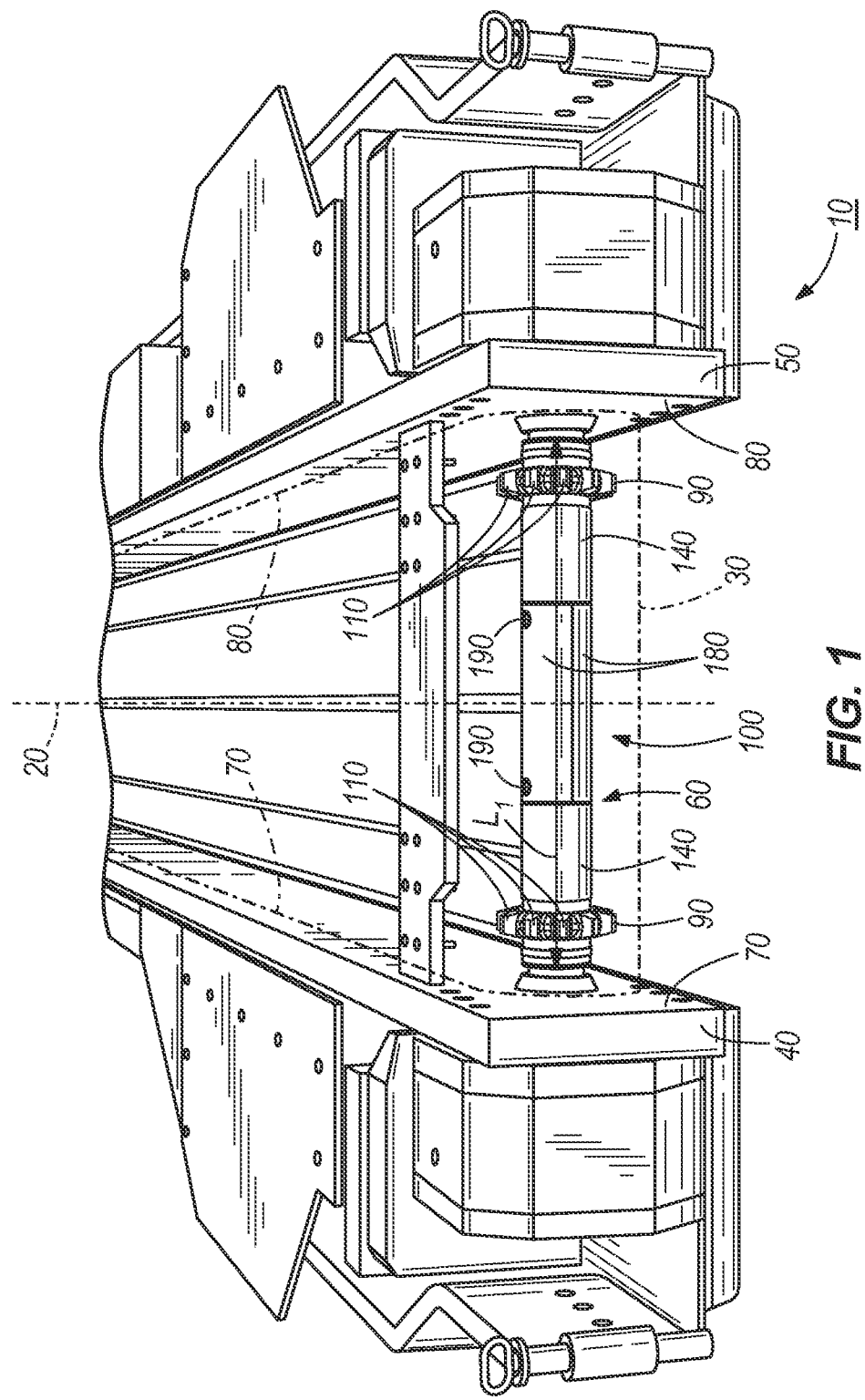
FIG. 1 is a perspective view of a conveyor system, illustrating a conveyor sprocket assembly engaging side frames.

FIG. 1 is a perspective view of a conveyor system 10. The conveyor system 10 defines a longitudinal axis 20, and includes a conveyor belt or chain 30 (illustrated in phantom lines in FIG. 1; see also FIG. 3) extending along the longitudinal axis 20, two side frames 40, 50, and a conveyor sprocket assembly 60. The conveyor 30 defines two sides 70, 80 that are each parallel to the longitudinal axis 20. As used herein, the terms "top," "bottom," "front," "rear," "side," and other directional terms are not intended to require any particular orientation, but are instead used for purposes of description only. The two side frames 40, 50 respectively extend along each side 70, 80 of the conveyor 30. Each side frame 40, 50 can house a respective conveyor drive assembly (not shown).

Figure 2:
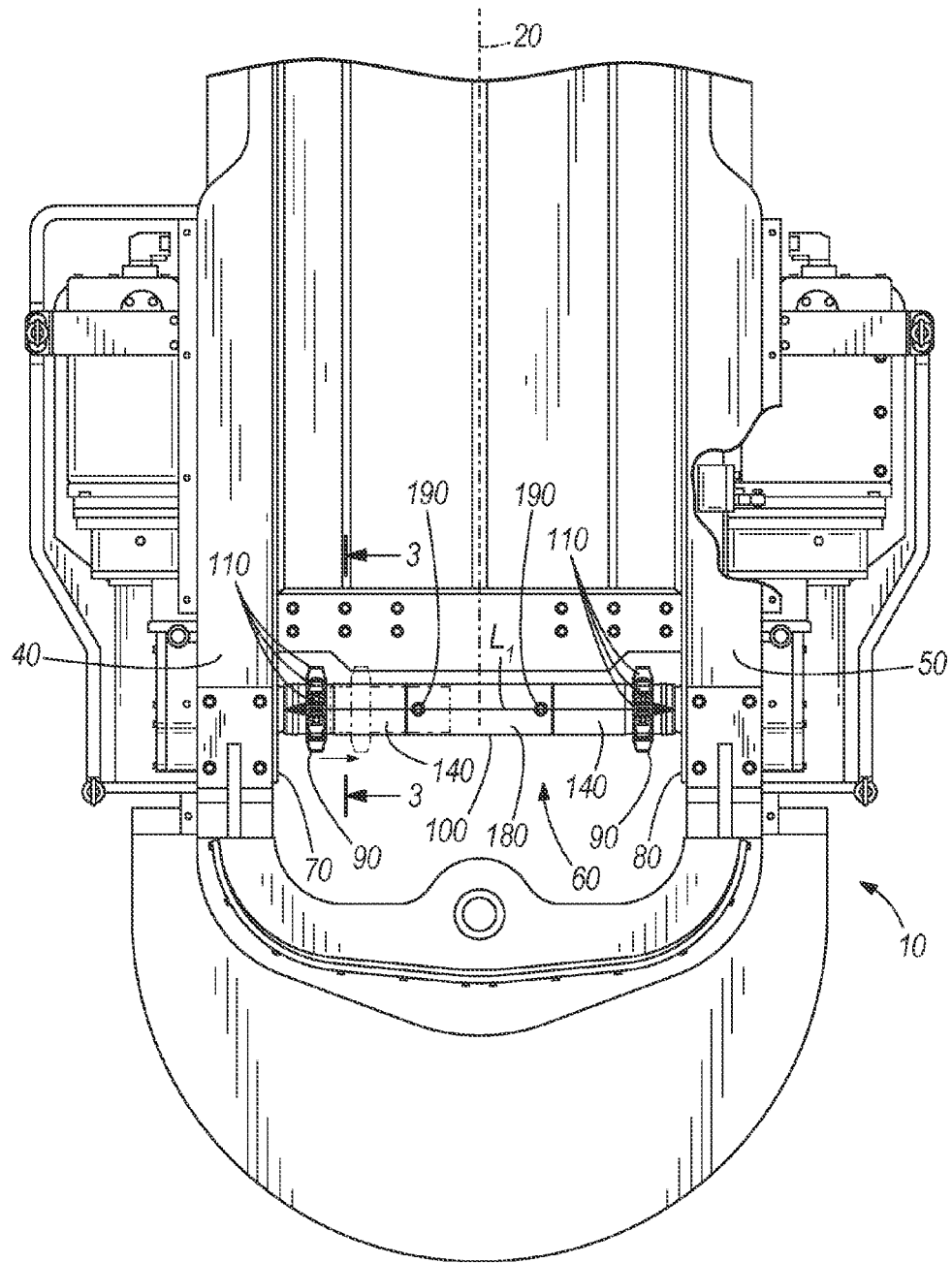
FIG. 2 is a top view of the conveyor system of FIG. 1.
Figure 3:
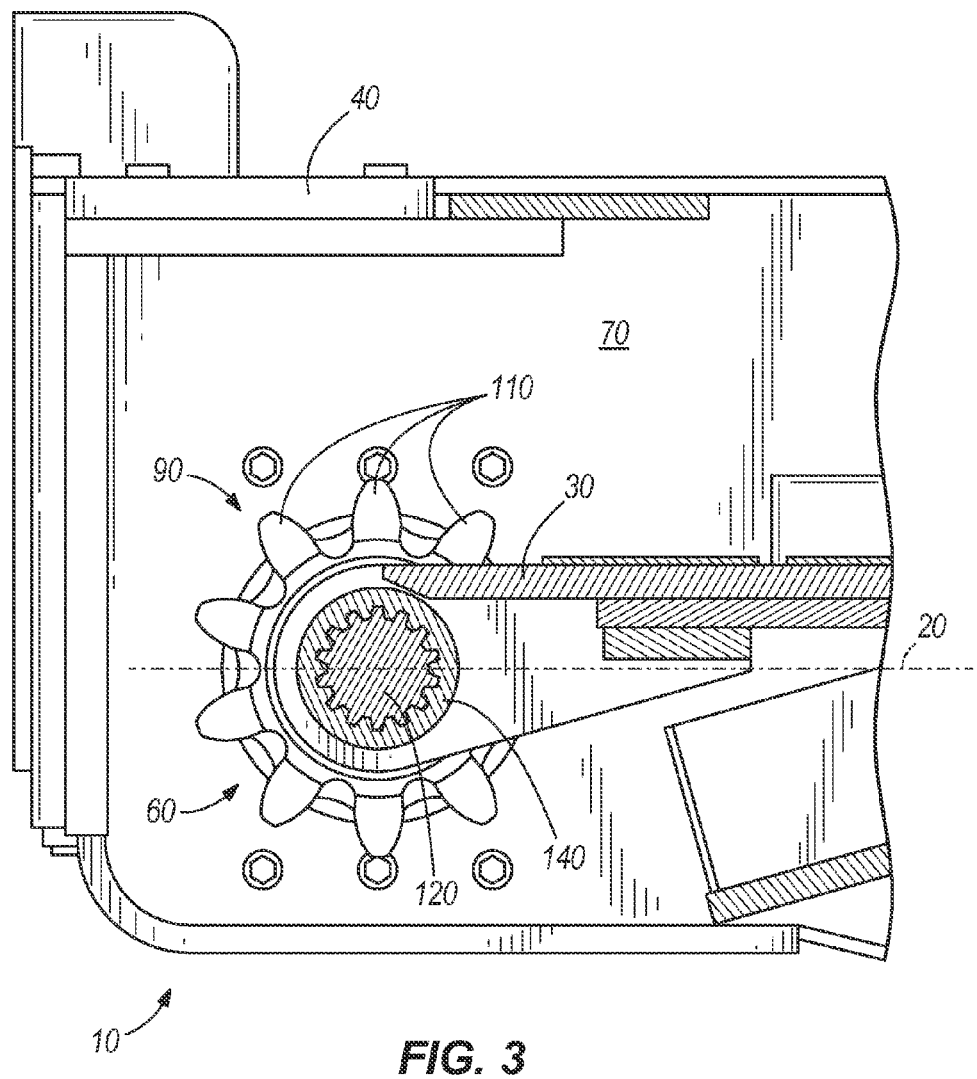
FIG. 3 is an enlarged partial cross-sectional view of the conveyor sprocket assembly taken along line 3-3 of FIG. 2.

The conveyor sprocket assembly 60 includes conveyor sprockets 90 and an abutment stop 100 positioned adjacent the conveyor sprockets 90. Each sprocket 90 is provided with a plurality of teeth 110 constructed and arranged to drivingly engage the conveyor 30. Referring also to FIGS. 2 and 3, although the illustrated conveyor sprockets 90 include a particular number of teeth 100, it is to be appreciated that other embodiments may utilize more or fewer teeth 100 depending for example on the pitch of the particular type of conveyor 30 being engaged.

In the illustrated embodiment, each conveyor sprocket 90 is formed as a single-piece, unitary sprocket, as opposed to a sprocket capable of being split or separated into multiple mating sections, e.g., a sprocket separable into two halves along a radial direction. Depending on the usage requirement or preferences for the particular conveyor sprocket assembly 60, a conveyor sprocket 90 that is separable into multiple sections may be cumbersome to assemble. For example, the parting or splitting lines of mating sections may be hard to align, and a locking mechanism is required to releasably or detachably lock the sections together, which may increase the sprocket's weight and costs of manufacturing and maintenance. Therefore, the conveyor sprocket assembly 60 preferably utilizes the illustrated single-piece conveyor sprockets 70. In some embodiments, however, one or more of the conveyor sprockets 90 may be separable into a plurality of complementary sections. Each conveyor sprocket 90 can be formed from metal, or can be made in other manners from other materials such as plastic.

Although FIG. 1 illustrates the conveyor sprocket assembly 60 as including two conveyor sprockets 90, it is to be appreciated that other embodiments may utilize other numbers of conveyor sprockets 90. For example, the conveyor sprocket assembly 60 may include one or more conveyor sprockets 90. Referring also to FIG. 2, the abutment stop 100 is configured to be removed to allow the conveyor sprockets 90 to slide axially (as illustrated by an arrow toward the configuration shown in phantom lines) for removing the conveyor sprocket from the conveyor drive assembly 60, and thereby from the side frames 40, 50, as will be explained further below.

Figure 4:
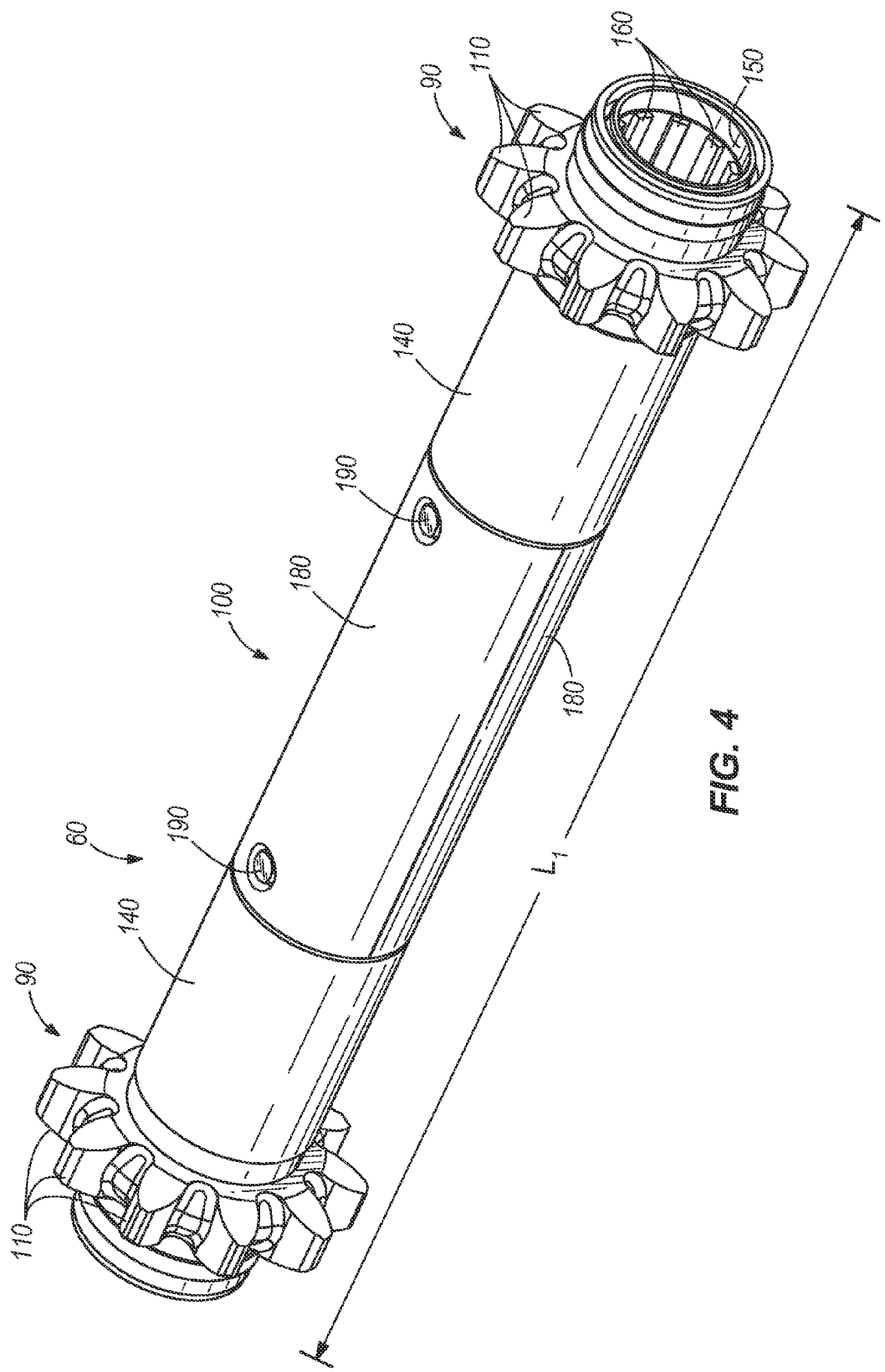
FIG. 4 is a perspective view of the conveyor sprocket assembly of FIG. 1.
Figure 5:
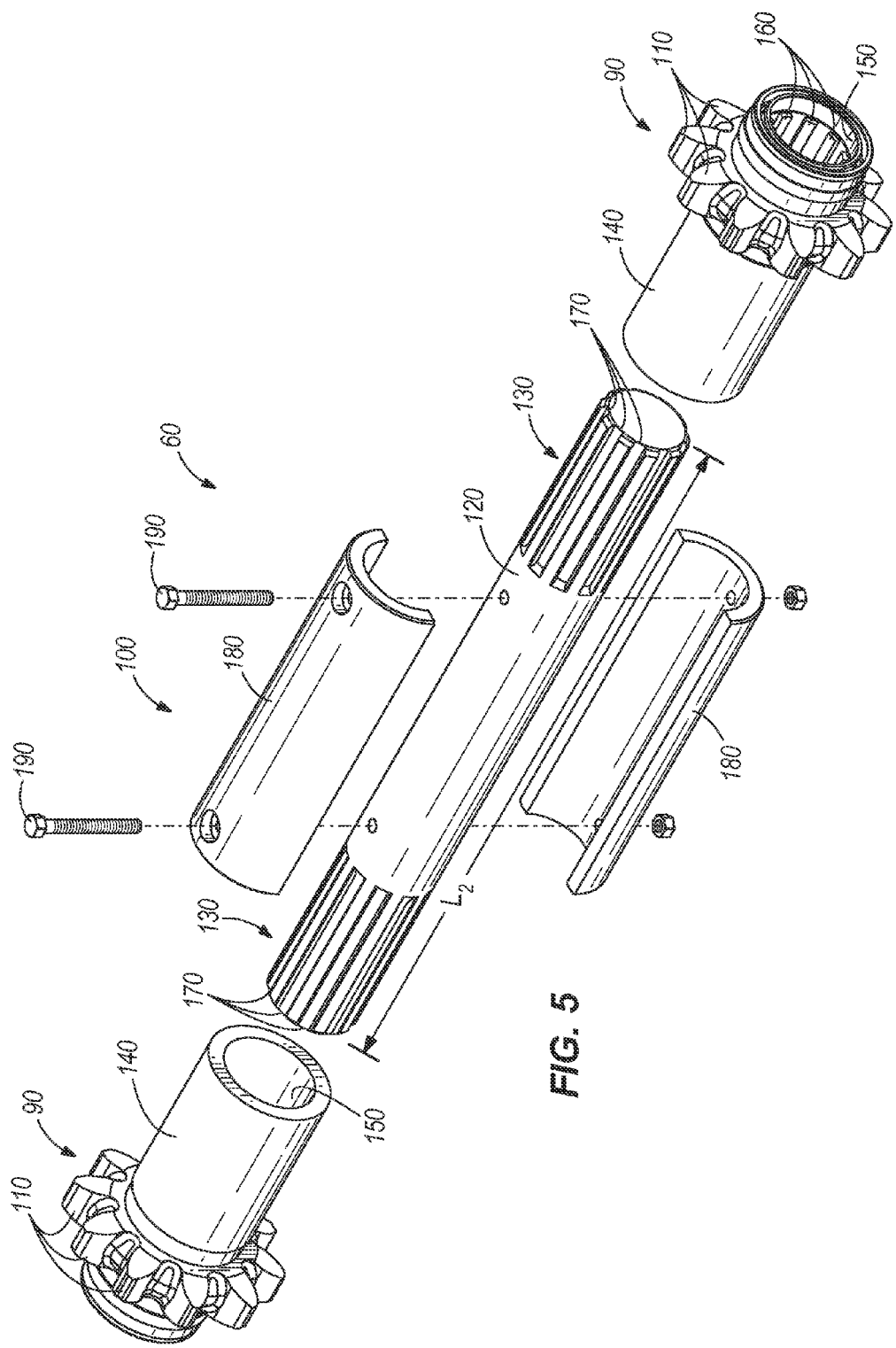
FIG. 5 is a perspective exploded view of the conveyor sprocket assembly of FIG. 4.

Referring also to FIGS. 4 and 5, the conveyor sprocket assembly 60 includes a support shaft 120, and the conveyor sprockets 90 slidably engage an end portion 130 (see FIG. 5) of the support shaft 120 and the conveyor drive assembly in respective side frames 40, 50. The conveyor sprocket assembly 60 defines an axial length $L_1$, which roughly corresponds to a gap between the side frames 40, 50. In some embodiments, the support shaft 120 has a length $L_2$ shorter than the axial length $L_1$. As will be explained further below, the shorter length $L_2$ of the support shaft 120 relative to the axial length $L_1$ of the conveyor sprocket assembly 60 facilitates an easy removal of the conveyor sprocket assembly 60 from the conveyor drive assembly of the side frames 40, 50. In other embodiments, however, the length $L_2$ is substantially similar to, or even slightly longer than, the axial length $L_1$ of the conveyor sprocket assembly 60. In the illustrated embodiment, each conveyor sprocket 90 includes a generally cylindrical member 140 defining an axial opening 150 therein for receiving the end portion 130 of the support shaft. In other embodiments, however, fewer than both of the conveyor sprockets 90 may include the member 140. In still other embodiments, the at least one of the member 140 and the axial opening 150 may assume any other geometric form, including, but not limited to, a semi-cylindrical, a conical, a regular polyhedral, and an irregular polyhedral shape, derivatives thereof, and combinations thereof.

Figure 11:
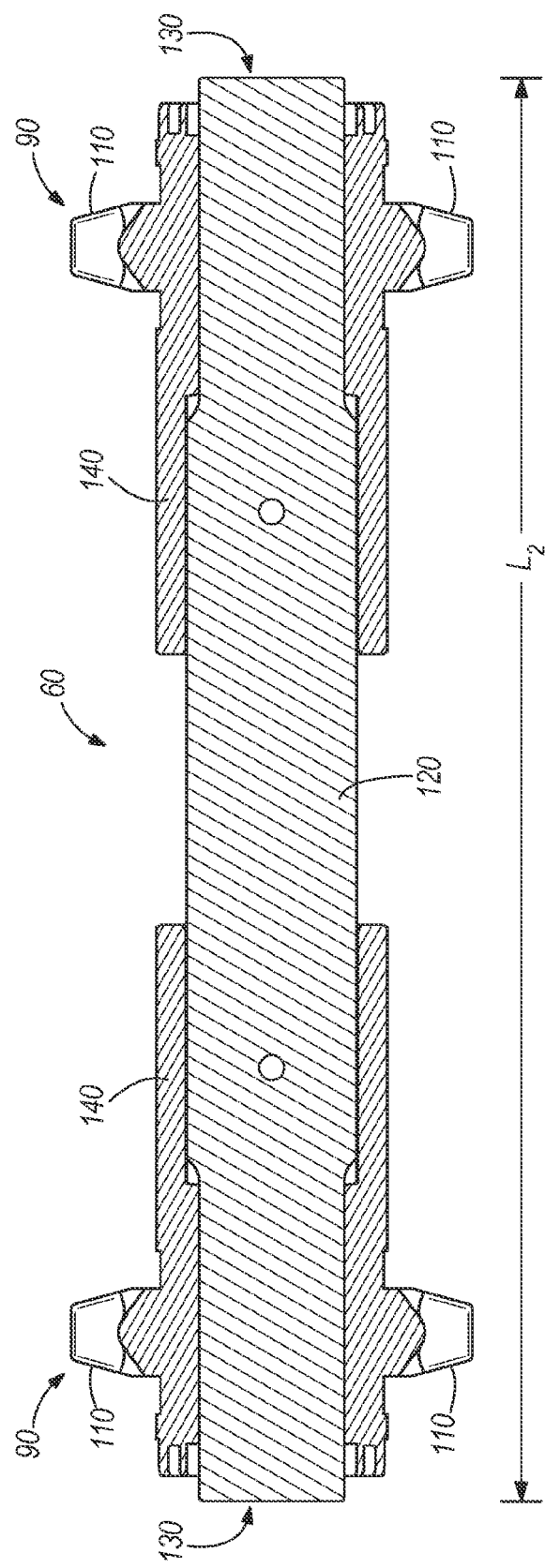
FIG. 11 is a cross-section view similar to FIG. 10, illustrating the conveyor sprockets as slid axially.

The illustrated generally cylindrical member 140 defines an inner surface 150 formed to be in mating engagement with the end portion 130 of the support shaft 120. In the illustrated embodiment, the inner surface 150 comprises splines 160, and the end portion 130 of the support shaft 120 comprises mating surfaces 170 formed to be in complementary relationship with the splines 160. Although FIGS. 4 and 5 illustrate the generally cylindrical member 140 and the support shaft 120 as including a particular number of splines 160 and mating surfaces 170, respectively, it is to be appreciated that other embodiments may utilize other numbers of splines 160 and mating surfaces 170. For example, the generally cylindrical member 140 may include one or more splines 160, and the support shaft 120 may include one or more mating surfaces 170. In some embodiments, at least a portion of the support shaft 120 is tapered in cross section along its axial length. For example, as illustrated in FIGS. 10 and 11, an intermediate portion of the support shaft 120 between the end portions 130 can be larger in cross section relative to the end portions 130. The larger cross section can function as a raised stop, preventing the conveyor sprocket 90 and the generally cylindrical member 140 from further sliding inwardly. Other configurations of the support shaft 120 are possible depending on the usage requirements or preferences for the conveyor sprocket assembly 60, including configurations where the support shaft 120 is substantially uniform in cross section along its axial length.

The illustrated abutment stop 100 includes a pair of shells 180 secured to the support shaft 120. In other embodiments, however, the abutment stop 100 may utilize other numbers of shells 180. For example, the abutment stop 100 may include one or more shells 180. Although FIG. 5 illustrates each shell 180 of the abutment stop 100 as having a semi-circular cross section, in other embodiments, one or more shells 180 of the abutment stop 100 may assume any geometric form in cross section, including, but not limited, a circular, a regular polyhedral, and an irregular polyhedral shape, derivates thereof, and combinations thereof. In the illustrated embodiment, the abutment stop 100 is so dimensioned as to give a substantially smooth linear appearance when the conveyor sprockets 90 slidably engage the support shaft 120 and the abutment stop 100 is positioned adjacent the conveyor sprockets 90. That is, the abutment stop 100 is substantially flush with an outer surface of the shells 180. In other embodiments, however, the abutment stop 100 can be slightly recessed relative to the outer surface of the shells 180, or even slightly raised relative to the outer surface of the shells 180.

In the illustrated embodiment, the conveyor sprocket assembly 60 includes a means for removably securing 190 each shell 180 of the abutment stop 100 on the support shaft 120. Each means for removably securing 190 applies a clamp force normal to the support shaft 120. In the embodiment shown, the means for removably securing 190 each shell 180 is a fastener, and as specifically shown in FIG. 5, a bolt or screw. In other embodiments, however, one or more of the shells 180 may be removably secured to the support shaft 120 using any suitable fasteners that provide a compressive force.

Figure 6:
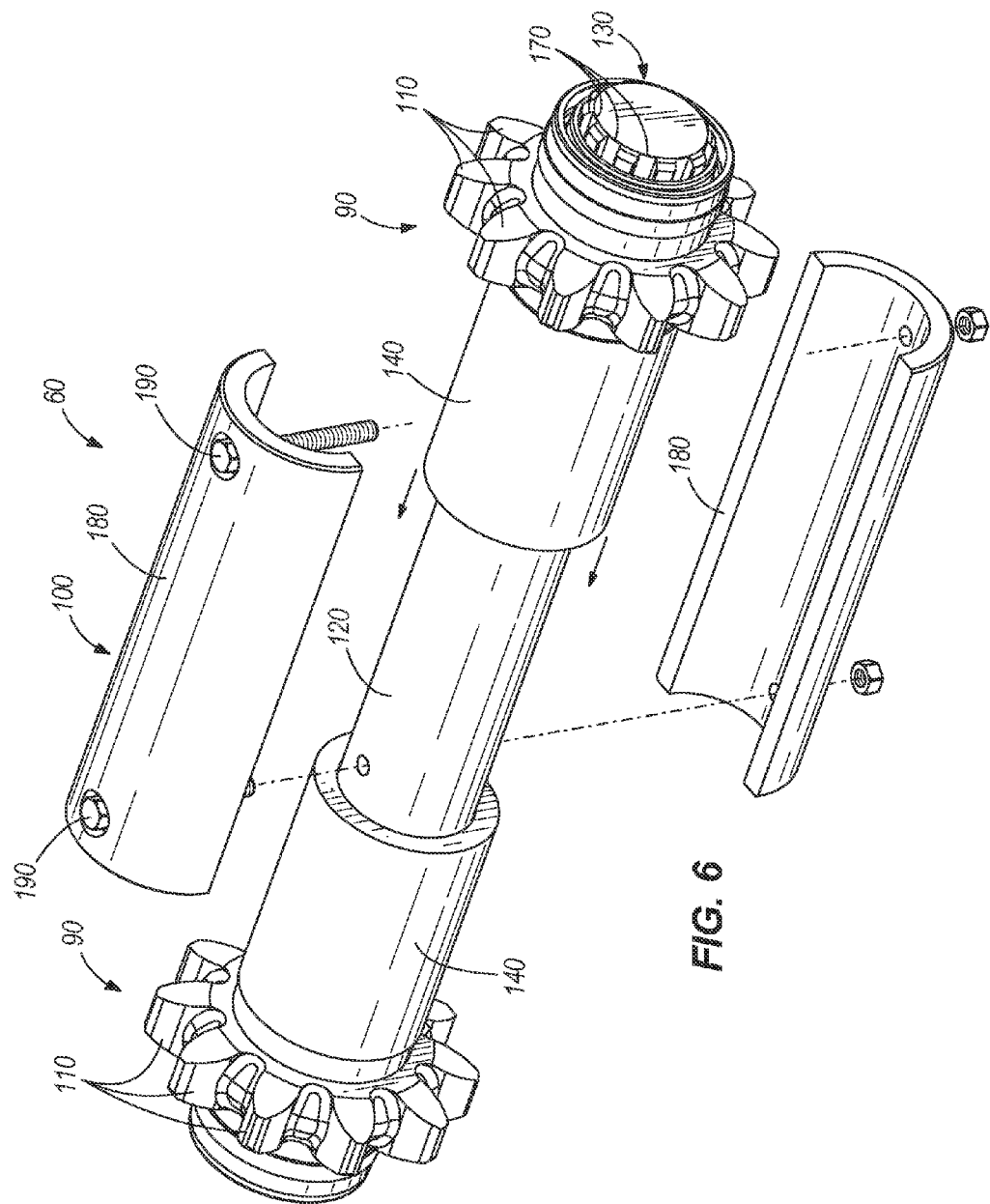
FIG. 6 is a perspective exploded view similar to FIG. 5, illustrating a conveyor sprocket sliding axially.
Figure 7:
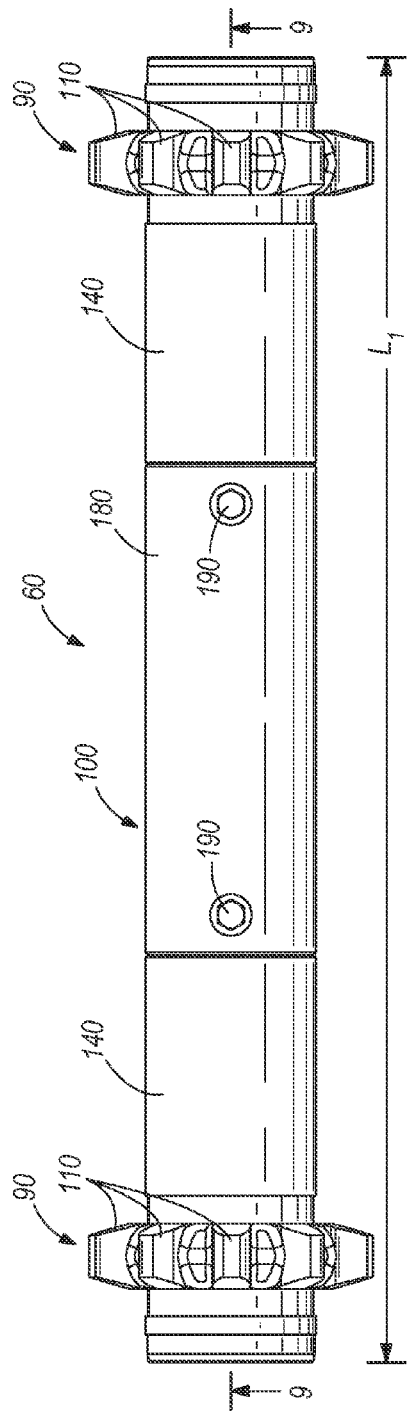
FIG. 7 is a top view of the conveyor sprocket assembly of FIG. 4.
Figure 8:
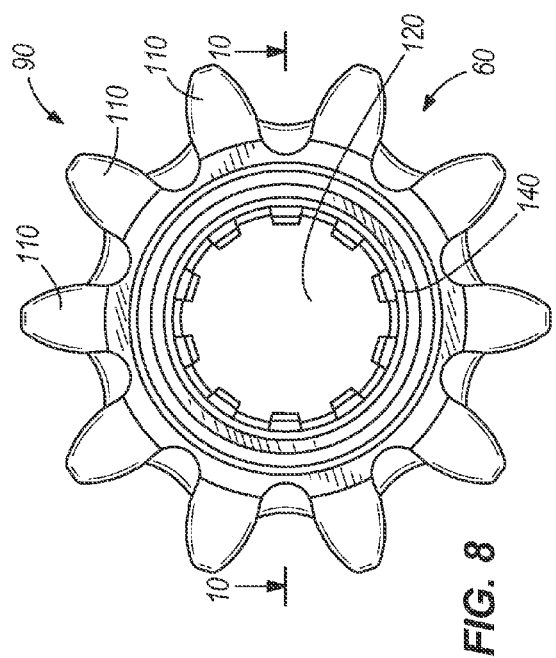
FIG. 8 is an end view of the conveyor sprocket assembly of FIG. 4.

FIG. 6 illustrates one of the conveyor sprockets 90 as moving or sliding axially inwardly. To replace the conveyor sprocket 90, for example when the conveyor sprocket 90 is worn or damaged, the abutment stop 100 is removed, and the conveyor sprocket 90 is slid axially toward the direction marked with arrows, thereby exposing the end portion 130 of the support shaft 120. Referring also to FIGS. 9-11, because the length $L_2$ of the support shaft 120 is shorter than the axial length $L_1$ of the conveyor sprocket assembly 60, once the conveyor sprocket 90 is slid axially inwardly, the length of the conveyor sprocket assembly 60 is reduced or contracted to a length shorter than the gap between the side frames 40, 50. Accordingly, the conveyor sprocket assembly 60 can be removed from the conveyor drive assembly of the side frames 40, 50 without removing or disassembling the side frames 40, 50 from the conveyor system 10, and the conveyor sprocket

70 can be replaced. In short, the reduced axial length of the conveyor sprocket assembly 60 facilitates an easy removal from the conveyor drive assembly of the side frames 40, 50.

Although the invention has been described in detail with reference to certain preferred embodiments, variations and modifications exist within the scope and spirit of one or more independent aspects of the invention as described.

What is claimed is:

1. A conveyor sprocket assembly comprising:
   a support shaft;
   at least one conveyor sprocket slidably engaging the support shaft; and
   an abutment stop positioned adjacent the conveyor sprocket, wherein the abutment stop is configured to be removed to allow the conveyor sprocket to slide axially along the support shaft, wherein the conveyor sprocket assembly defines an axial length, and wherein the support shaft has a length shorter than the axial length.

2. A conveyor sprocket assembly as set forth in claim 1, wherein the conveyor sprocket comprises a generally cylindrical member defining an axial opening therein for receiving an end portion of the support shaft.

3. A conveyor sprocket assembly as set forth in claim 2, wherein the cylindrical member defines an inner surface formed to be in mating engagement with the end portion of the support shaft.

4. A conveyor sprocket assembly as set forth in claim 3, wherein the inner surface comprises at least one spline and wherein the end portion of the support shaft comprises at least one mating surface formed to be in complementary relationship with the spline.

5. A conveyor sprocket assembly as set forth in claim 1, wherein the abutment stop includes a plurality of shells secured to the support shaft.

6. A conveyor sprocket assembly as set forth in claim 1 further comprising a fastener for removably securing the abutment stop on the support shaft.

7. A conveyor sprocket assembly as set forth in claim 1 further comprising a means for removably securing the abutment stop on the support shaft, wherein the means for securing applies a clamp force substantially normal to the support shaft.

8. A conveyor sprocket assembly as set forth in claim 1, wherein the abutment stop is so dimensioned as to give a substantially smooth linear appearance when the conveyor sprocket slidably engages the support shaft and the abutment stop is positioned adjacent the conveyor sprocket.

9. A conveyor sprocket assembly, the conveyor sprocket assembly defining an axial length, the conveyor sprocket assembly comprising:
   a support shaft having a length shorter than the axial length;
   at least one conveyor sprocket slidably engaging an end portion of the support shaft and a conveyor drive assembly, the conveyor sprocket comprising a generally cylindrical member defining an axial opening therein for receiving the end portion of the support shaft; and
   an abutment stop positioned adjacent the conveyor sprocket, wherein the abutment stop is configured to be removed to allow the conveyor sprocket to slide axially along the support shaft for removing the conveyor sprocket from the conveyor drive assembly.

10. A conveyor sprocket assembly as set forth in claim 9, wherein the cylindrical member defines an inner surface formed to be in mating engagement with the end portion of the support shaft.

11. A conveyor sprocket assembly as set forth in claim 10, wherein the inner surface comprises at least one spline and wherein the end portion of the support shaft comprises at least one mating surface formed to be in complementary relationship with the spline.

12. A conveyor sprocket assembly as set forth in claim 9, wherein the abutment stop includes a plurality of shells secured to the support shaft.

13. A conveyor sprocket assembly as set forth in claim 9 further comprising a means for removably securing the abutment stop on the support shaft, wherein the means for securing applies a clamp force substantially normal to the support shaft.

14. A conveyor sprocket assembly as set forth in claim 9, wherein the abutment stop is so dimensioned as to give a substantially smooth linear appearance when the conveyor sprocket slidably engages the end portion of the support shaft and the abutment stop is positioned adjacent the conveyor sprocket.

15. A conveyor system defining a longitudinal axis, the system comprising:
   a conveyor extending along the longitudinal axis, the conveyor defining two sides that are each parallel to the longitudinal axis;
   two side frames, one extending along each side of the conveyor, the side frames defining a gap therebetween;
   a support shaft having a length shorter than the gap;
   at least one conveyor sprocket slidably engaging an end portion of the support shaft and a respective side frame; and
   an abutment stop positioned adjacent the conveyor sprocket, wherein the abutment stop is configured to be removed for removing the conveyor sprocket from the side frames.

16. A conveyor system as set forth in claim 15, wherein the conveyor sprocket comprises a generally cylindrical member defining an axial opening therein for receiving the end portion of the support shaft.

17. A conveyor system as set forth in claim 16, wherein the cylindrical member defines an inner surface formed to be in mating engagement with the end portion of the support shaft.

18. A conveyor system as set forth in claim 17, wherein the inner surface comprises at least one spline and wherein the end portion of the support shaft comprises at least one mating surface formed to be in complementary relationship with the spline.

19. A conveyor system as set forth in claim 15, wherein the abutment stop includes a plurality of shells secured to the support shaft.

20. A conveyor system as set forth in claim 15 further comprising a fastener for removably securing the abutment stop on the support shaft.

21. A conveyor system as set forth in claim 15 further comprising a means for removably securing the abutment stop on the support shaft, wherein the means for securing applies a clamp force substantially normal to the support shaft.

22. A conveyor system as set forth in claim 15, wherein the abutment stop is so dimensioned as to give a substantially smooth linear appearance when the conveyor sprocket slidably engages the end portion of the support shaft and the abutment stop is positioned adjacent the conveyor sprocket.

* * * * *